UNITED STATES PATENT OFFICE.

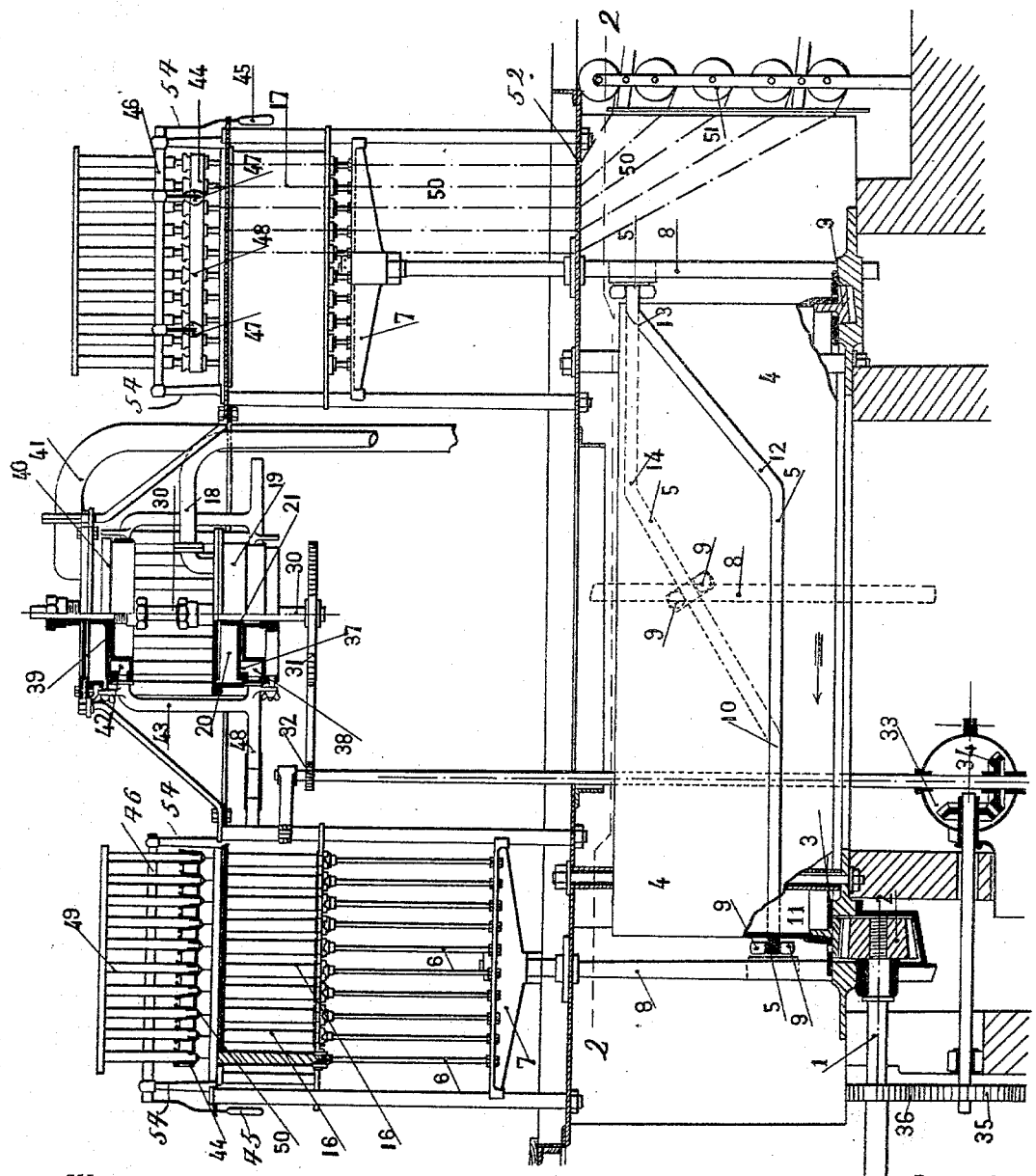

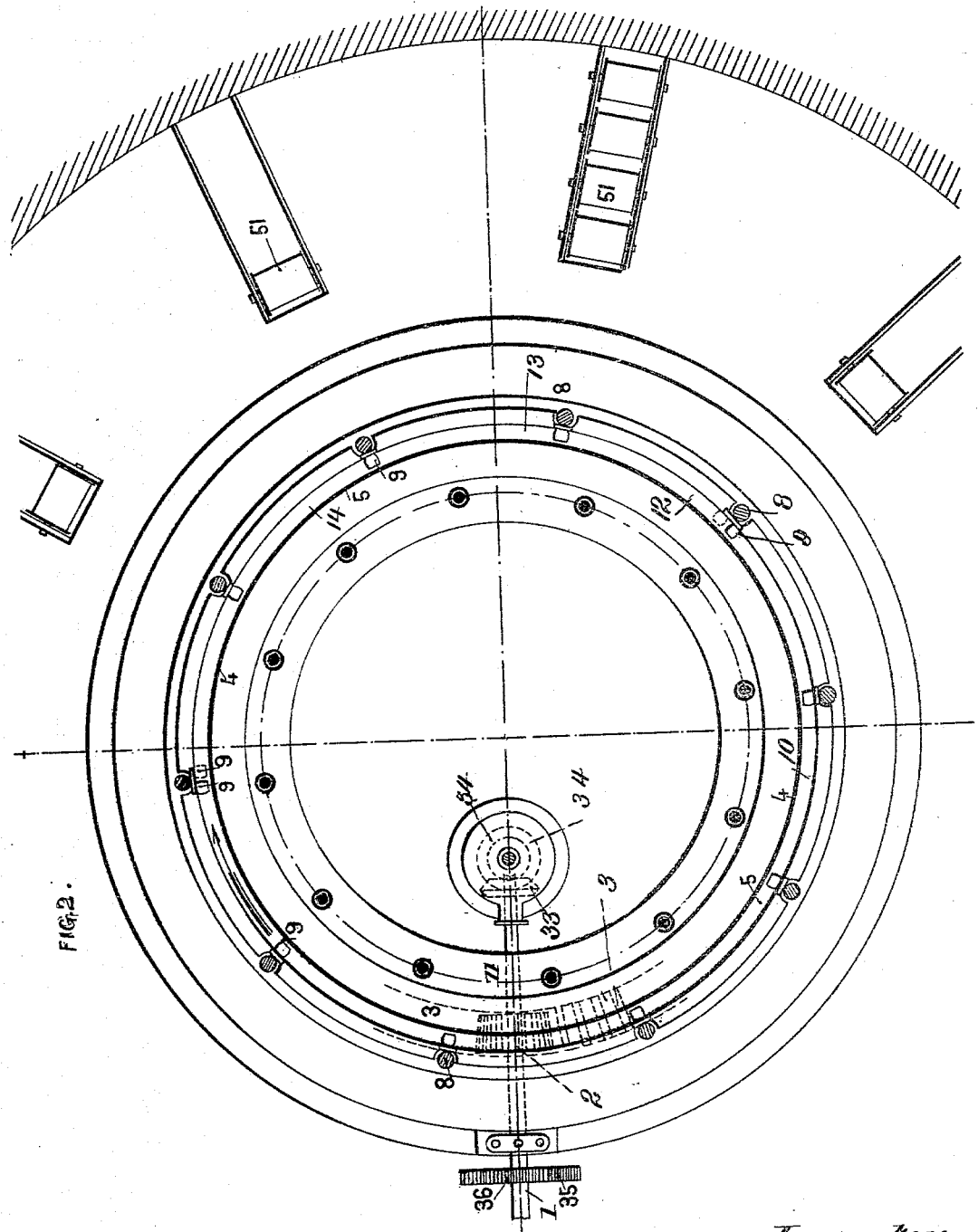

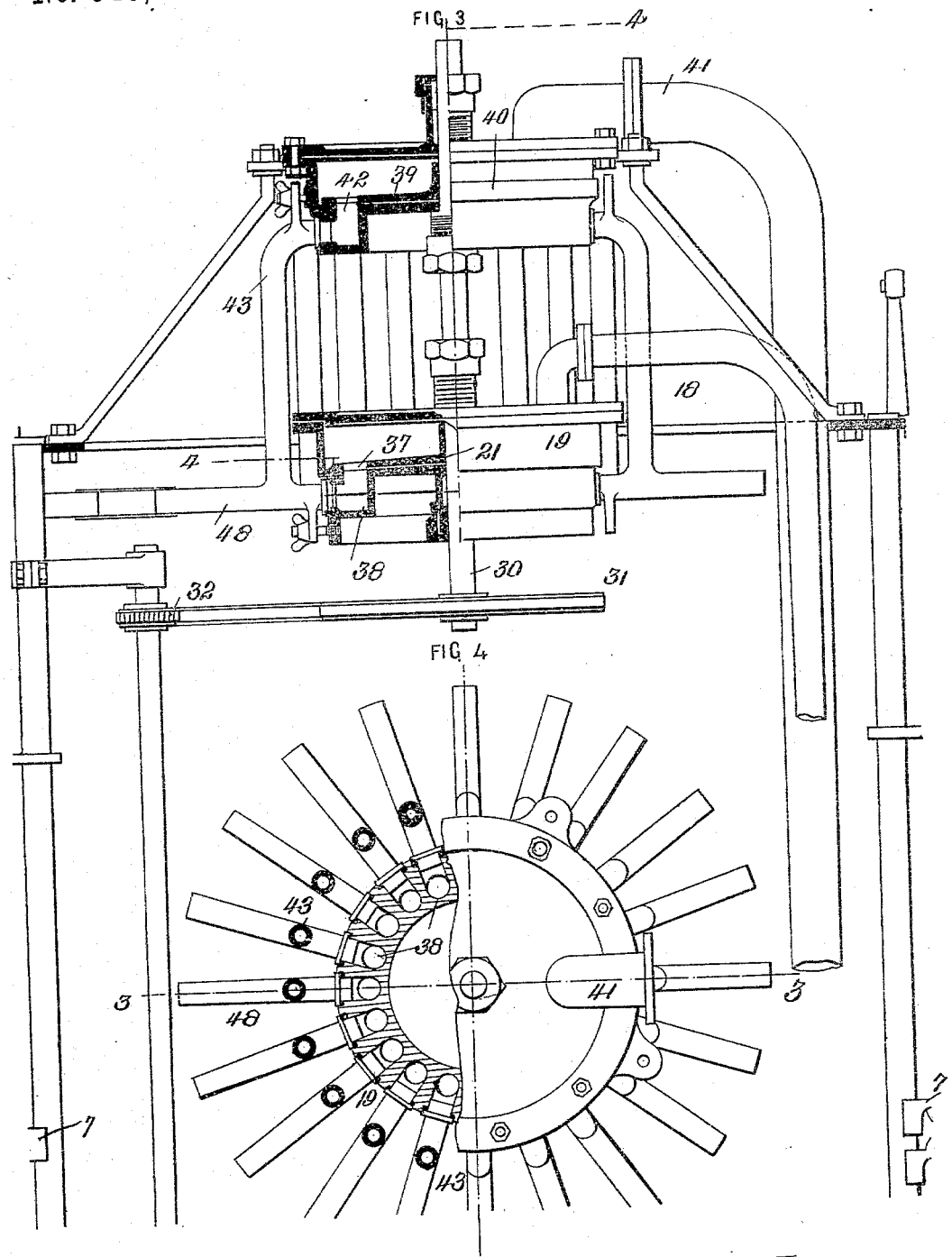

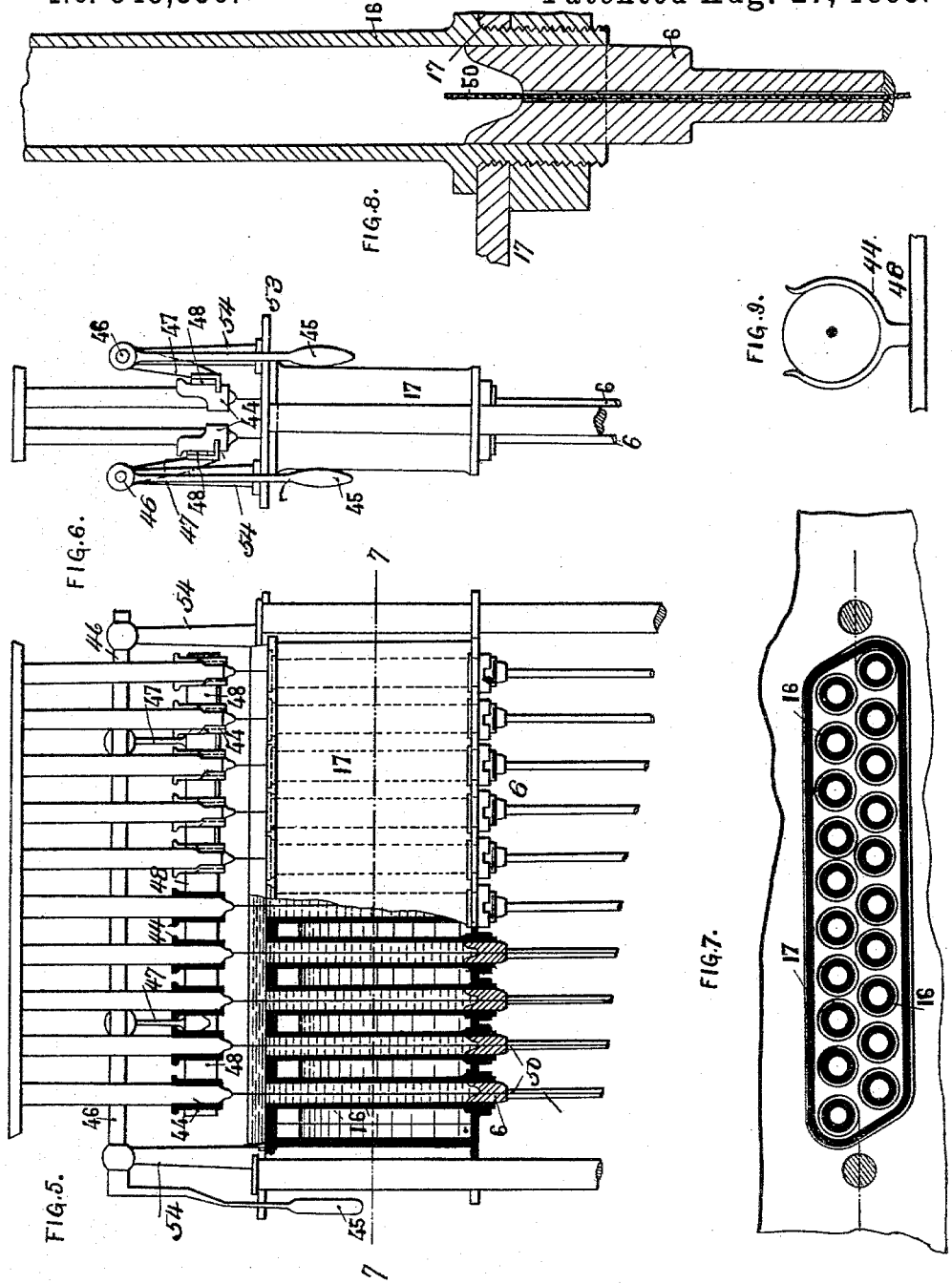

LOUIS JEAN BAPTISTE FOURNIER, OF MARSEILLES, FRANCE.

APPARATUS FOR MOLDING CANDLES.

SPECIFICATION forming part of Letters Patent No. 545,356, dated August 27, 1895.

Application filed December 14, 1893. Serial No. 493,678. (No model.)

*To all whom it may concern:*

Be it known that I, LOUIS JEAN BAPTISTE FOURNIER, a citizen of the French Republic, residing at Marseilles, France, have invented certain new and useful Improvements in Machines for the Manufacture of Candles, of which the following is a specification.

This invention relates to machines for molding candles, and has for its object to improve and simplify the construction and increase the efficiency of machines of this nature and to render the same automatic in action.

To these ends my invention consists of the features and in the construction or arrangement of parts hereinafter described, and pointed out in the claims following the description, due reference being had to the accompanying drawings, forming a part of this specification, wherein—

Figure 1 is a vertical section taken through the axis of the machine. Fig. 2 is a horizontal section taken on the line 2 2 of Fig. 1. Fig. 3 is an elevation, partly in section, taken on the line 3 3 of Fig. 4, showing the hot and cold water distributer. Fig. 4 is a plan view of the same, partly in section, taken on the line 4 4 of Fig. 3. Fig. 5 is an elevation, partly in section, of one of the water-tanks and the candle-molds, together with the rocking candle-supports. Fig. 6 is an end view of the same. Fig. 7 is a horizontal section taken on the line 7 7 of Fig. 5. Fig. 8 is a vertical section of a portion of one of the molds and its ejector, drawn on an enlarged scale; and Fig. 9 is a detail plan view of one of the clasps for supporting the candles.

Referring to the drawings, the numeral 1 indicates a driving-shaft, which is actuated by a motor of any suitable or preferred description, and is provided with a pinion 2, that meshes with a rack 3, arranged on the lower edge of a rotary drum 4, and operates to continuously rotate said drum about its axis. Ejectors 6—one for each mold—are carried by a plate 7 mounted on a rod 8, vertically movable in suitable bearings, and upon said rod are arranged two friction-rollers 9, that engage the upper and lower sides of a rib or flange 5, formed on the periphery of the drum 4. The said rib is provided with two horizontal portions and two inclined portions, whereby when the drum is rotated the friction-rollers, and with them the rod 8 and ejectors 6, will be caused to rise and fall during a portion of the rotation of the drum, and during the remaining period of such rotation will be held stationary. Thus, supposing the drum to be rotating in the direction of the arrow shown in Fig. 1, the plate 7 (shown on the left side of said figure) will remain stationary and in its lowermost position as long as the rotation of the drum causes the horizontal portion 10, 11, and 12 of the rib 5 to pass between the rollers 9. During the passage of the inclined portion 12 13 of the rib between the rollers the latter ascend the rib, which causes the rod 8, the plate 7, and the ejectors 6 to rise and eject the candles from the molds, as will more fully hereinafter appear, and as the horizontal portion 13 14 of the rib passes between the rollers the ejectors will be held in their highest position, and, finally, when the inclined portion 14 10 of said rib passes between the rollers the latter will be caused to descend and lower the ejectors in the molds and prepare the latter for a fresh molding.

The molds 16 are arranged in groups in boxes or tanks 17, the said boxes being arranged to alternately receive hot and cold water, the hot water surrounding the molds before the operation of molding, after which the hot water is discharged and cold water is admitted to surround the molds to hasten the cooling and setting of the candles, and for this purpose I provide automatic mechanism, as follows:

The numeral 19 indicates a hot-water-distributing box, which is continuously supplied with hot water by a supply-pipe 18, and is provided in its bottom with a number of discharge-passages 38, each connected by a pipe 48 with one of the mold boxes or tanks 17. A rotary plate 21 is arranged in the bottom of the distributing-box 19, and is rigidly mounted on a vertical shaft 30, passing through the center of said box and provided upon its lower end with a gear-wheel 31, which is rotated through the medium of the train of gearing 32, 33, 34, 35, and 36 by the main shaft 1. The plate 21 is provided with a number of apertures 37 corresponding to the passages 38, and as said plate rotates it operates to alternately admit and cut off the supply of hot water to the pipes 48 that lead to the mold boxes or tanks. Above the hot-water-distributing box 19 is arranged a similar distributing-box 40, having a distributer-plate 39, also mounted on the shaft 30, and said box is supplied with cold water by a supply-pipe 41. The discharge-passages 42 communicate with the pipes 48, before described, by means of pipes 43, and the distributer-plates 21 and 39 are so arranged that while the hot-water-distributing box is supplying water to the mold boxes or tanks the supply from the cold-water-distributing box will be cut off. The mold-boxes are emptied by hand by means of a cock which is arranged in the lower end of each of said boxes.

Upon the top of each of the mold-boxes 17 are secured uprights 54, in which are journaled rock-shafts 46, provided with cranks 45 and carrying arms 47, to the lower ends of which are secured bars 48, carrying clasps 44. Said clasps (more clearly shown in Figs. 5, 6, and 9) each consist of a nearly-annular piece of resilient sheet metal having its ends made flaring to more readily embrace the candle, as will hereinafter be described.

The upper ends of the ejectors 6 are formed with tapering recesses of the proper shape to give to the end of the candle the proper conventional configuration, and said ejectors are apertured or cored out axially to permit of the passage of the wicks therethrough. The wicks 50 are wound upon spools 51, mounted in suitable bearings, the spool-spindles being preferably slightly roughened to prevent the spools from turning by acquired momentum. From the spools 51 the wicks pass through suitable apertures formed in guide-plates 52 and 53 and from thence up through the ejectors 6 and through the axial center of the molds 16.

The operation of my machine is as follows: When the parts are in the position shown on the left side of Fig. 1, with the ejectors 6 lowered, the melted stearine is poured into the top of the box 17, which top communicates with the upper ends of all the molds 16 contained in said box until all the molds are completely filled and until the stearine rises in the top of the box 17, as shown in Fig. 5. The hot water surrounding the molds, which has been admitted to the box 17 from the distributing-box 19 in the manner before described, is now permitted to escape and cold water is supplied to the box by the distributing-box 40, thus cooling the molds and causing the candles to set. When the candles are completely set, they are united at their upper ends by a solid cake of stearine, as shown. When the inclined portion 12 13 of the rib 5 on the rotating drum 4 engages the rollers 9, the ejectors 6 are raised, and at a single movement the candles are raised and forced out of the molds, drawing with them sufficient lengths of wicks for the next molding. As soon as the cake uniting the upper ends of the candles has been raised above the holders 44 the rock-shafts 46 are partially rotated to cause said holders to clasp the candles and hold them in their raised positions, as more clearly shown in Figs. 5 and 6. In this position the candles will hold the wicks centrally in the molds for the next molding. As the inclined portion 14 10 of the rib on the drum engages the friction-rollers the ejectors 6 are again lowered to the bottom of the molds and the molds are again filled. After the molds have been again filled the wicks of the finished candles are cut and the candles removed from the holders 44 and the rock-shafts 46 are turned to swing the holders out of the path of the cake uniting the upper ends of the candles below. After the candles have been removed the cake is cut from the molded candles in any suitable or preferred manner. It will be understood that the movement imparted to the ejectors by the drum is intermittent, the inclined portions of the rib 5 operating to raise and lower the ejectors, and the horizontal portions thereof holding said ejectors in both their raised and lowered positions for a period of time sufficient to permit the molds being filled and the candles to set, and also to permit the wicks being cut and the finished candles removed.

I have described the operation of but a single group of molds and their attachments; but it will be understood that a number of such groups are employed and that they are operated successively.

Having described my invention, what I claim is—

1. In a candle molding machine, the combination with a series of mold boxes, a group of molds arranged in each box, reciprocating ejectors arranged in said molds, a rod connected to each group of ejectors, and a rotary drum provided with a peripheral cam-shaped rib engaging said rods and operating to raise and lower the ejectors and hold them in their raised and lowered position for definite periods of time, substantially as described.

2. In a candle molding machine, the combination with a series of mold boxes, a group of molds arranged in each box, reciprocating ejectors arranged in said molds, a rod connected to each group of ejectors, a rotary drum provided with a peripheral cam-shaped rib engaging said rods and operating to raise and lower the ejectors and hold them in their raised and lowered position for definite periods of time, and means for grasping and holding the molded candles over the molds after they have been ejected from the latter, substantially as described.

3. In a candle molding machine, the combination with a series of mold boxes, a group of molds arranged in each box, reciprocating ejectors arranged in said molds, a rod connected to each group of ejectors, a rotary drum provided with a peripheral cam-shaped rib engaging said rods and operating to raise and lower the ejectors and hold them in their raised and lowered position for definite periods of time, and means for alternately and automatically supplying hot and cold water to the mold boxes, substantially as described.

4. In a candle molding machine, the combination with a series of mold boxes, a group of molds arranged in each box, reciprocating ejectors arranged in said molds and axially cored throughout their length, means for raising and lowering said ejectors, means for grasping and holding the molded candles over the molds, and a series of wick spools, one for each mold, the wicks passing from said spools through suitable guides and through the axially cored ejectors to the molds, substantially as described.

5. In a candle molding machine, the combination with a series of mold boxes, a group of molds arranged in each box, a hot and a cold water distributing box each having discharge passages corresponding in number to the mold boxes, pipes connecting said passages with said mold boxes and rotary cut-offs arranged in said distributing boxes and operating to alternately supply hot and cold water to the mold boxes, substantially as described.

In testimony whereof I have signed this specification in the presence of two subscribing witnesses.

L. FOURNIER.

Witnesses:
 H. GRIGAINE,
 E. BRUANOTT.